Patented Dec. 8, 1931

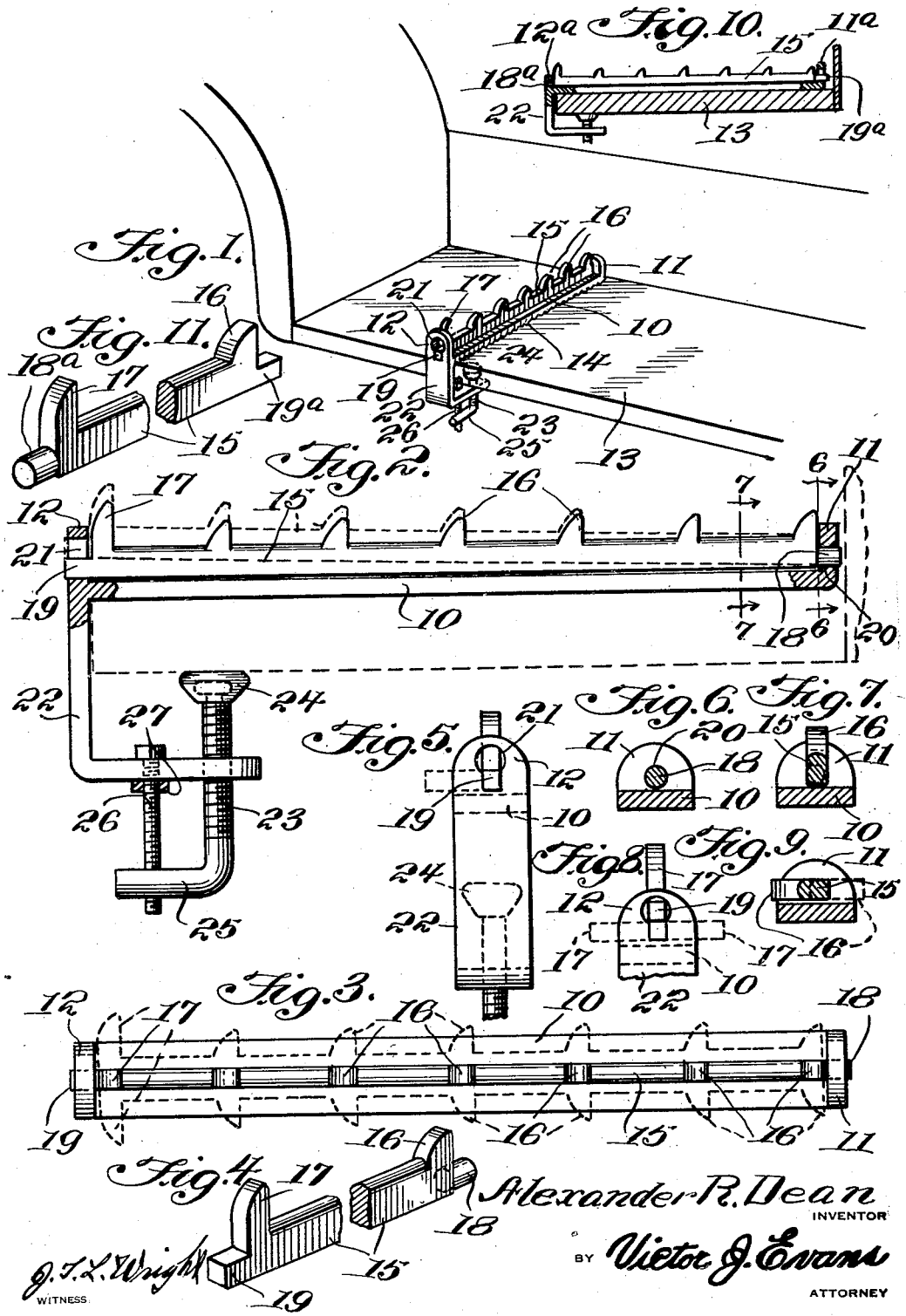

1,835,935

UNITED STATES PATENT OFFICE

ALEXANDER R. DEAN, OF TULSA, OKLAHOMA

RUNNING BOARD ICE HOLDER

Application filed January 20, 1930. Serial No. 422,134.

This invention relates to attachments for automobiles, an object being to provide a device which may be removably attached to the running board of an automobile to engage and prevent a block of ice from accidentally slipping from the running board.

Another object of the invention is the provision of a device of the above character which may be readily moved into and out of position for use, and which may also be used as a carrier for various other articles, or in conjunction with an ordinary luggage carrier. In addition, the invention may be used for cleaning mud from the shoes of persons entering the automobile.

Another object of the invention is the provision of a device of novel construction which may be cheaply manufactured, and which will provide for a quick and ready engagement with a block of ice under the weight of the latter.

With the above and other objects in view, the invention further includes the following novel features and details of construction, to be hereinafter more fully described, illustrated in the accompanying drawings and pointed out in the appended claims.

In the drawings:

Figure 1 is a perspective view showing a fragmentary portion of the running board of an automobile with the invention applied.

Figure 2 is a transverse sectional view of the same.

Figure 3 is a plan view of the attachment per se.

Figure 4 is a fragmentary perspective view of the toothed bar.

Figure 5 is an end view of the attachment.

Figures 6 and 7 are detail sectional views taken respectively on the lines 6—6 and 7—7 of Figure 2.

Figure 8 is a fragmentary end view showing the toothed bar elevated for rotation.

Figure 9 is a transverse sectional view showing the toothed bar in an inactive position.

Figure 10 is a sectional view taken transversely through the running board of an automobile and showing a slightly different form of the invention.

Figure 11 is a fragmentary prespective view of the toothed bar shown in Figure 10.

Referring to the drawings in detail wherein like characters of reference denote corresponding parts, the invention as shown comprises a frame which includes a bar 10 having upstanding ears 11 and 12 at opposite ends. This bar is transversely flat and is adapted to extend transversely of the running board 13 of an automobile, and its underface may be roughened as indicated at 14 by grooving or embossing lines, dots, dents, letters or figures in or on the underface of the metal itself for frictional engagement with the running board.

The frame referred to carries a bar 15 which is disposed longitudinally of the frame and has extending from one edge, teeth 16 and 17. The bar 15 also has extending from one end a round trunnion 18, while extending from the opposite end of the bar is a square or rectangular trunnion 19. The trunnion 18 is rotatably mounted in a circular opening 20 provided in the ear 11, while the ear 12 is provided with a key-hole slot 21, which includes an upper circular portion and a lower rectangular portion, as shown in Figure 5 of the drawings.

An angle arm 22 extends downwardly from one end of the frame and the inner end of this arm has a threaded engagement with the clamping screw 23. One end of this screw carries a swivelled head 24 to engage the underface of the running board, while the other end of the screw is provided with an angularly disposed handle 25. Between the screw 23 and the angle of the arm 22 is a second threaded hole through which a small bolt 26 bearing a tap 27 may be screwed downwardly to prevent the handle 25 from unwinding and losing the ice holder off the running board, and which will also make it difficult for thieves to remove the same.

The frame is designed to be attached transversely of the running board of an automobile through the medium of the clamping screw, as shown in Figures 1 and 2 of the drawings. Normally, the bar 15 lies flat upon the bar 10 with the teeth 16 and 17 horizontally arranged as shown in full lines in Figure 9 of the drawings and by dotted lines in Figures 3 and 5. When it is desired to use the attachment, the outer end of the bar 15 is raised so that the trunnion 19 will be within the circular portion of the key-hole slot 21, as shown by dotted lines in Figure 2 of the drawings, and by full lines in Figure 8. A quarter rotation is then given the bar 15 so that the teeth 16 and 17 will be arranged vertically. The bar 15 may then be lowered so that the trunnion 19 will re-engage the walls of the lower portion of the slot 21. The bar will then be firmly held with the teeth vertically disposed. When the ice is placed upon the bar, the teeth will penetrate the ice and hold the latter against movement. Positive engagement between the device and the ice is quickly assured by reason of the relatively long single tooth 17, as this tooth will quickly enter the ice. As the tooth 17 is positioned at the outer end of the bar, the initial position of the ice will be inwardly inclined so that there will be no tendency for the ice to slip outward.

The bar 15 with the teeth 16 and 17 may be readily returned to its normally inactive position by again raising the outer end of the bar and giving the same a quarter rotation to re-engage within the lower end of the slot 21.

The form of the invention shown in Figures 10 and 11 is identical with the form just described, except that the square trunnion 19a engages the inner ear 11a and the round trunnion 18a engages the outer ear 12a. In this form of the invention, the key-hole slot is of course in the ear 11a. The bar 15 may be positioned horizontally and a rope, strap or the like may be suitably secured through the opening in the ear 11a, carried forward over the luggage and secured to the arm 22 to provide a complete luggage carrier.

In either form of the invention, the bar 15, when horizontally arranged, will provide an efficient scraper for removing mud from shoes.

By reason of the shape of the teeth, a block of ice when placed on the holder will move easily into position against or near the apron of the car without the necessity of jamming the ice into place and marring the body of the car with the ice tongs. The rounded edge of the teeth will cause the ice to slide into position with a slight push of the hand or knee. When in position the ice will not move and must be raised entirely clear of the teeth before it can be manually removed.

The manner of attaching the holder to the running board, renders it practically theft-proof and proof against loss by working loose from the running board.

The invention is susceptible of various changes in its form, proportions and minor details of construction and the right is herein reserved to make such changes as properly fall within the scope of the appended claims.

Having described the invention what is claimed is:—

1. An ice holder comprising an attaching member arranged transversely of and secured to a running board, upstanding ears at the ends of said member and one of said ears having an opening and the other ear having a keyhole slot, a toothed bar extending parallel with said member and having one end journalled in the opening, and a squared extension on the other end of the bar which is received by the keyhole slot and when in one end of the slot is adapted to hold said bar against rotation and when positioned in the other end of the slot is adapted to permit the bar to be turned in either direction.

2. An ice holder comprising an attaching member arranged transversely of and secured to a running board, upstanding ears at the ends of said member and one of said ears having an opening and the other ear having a keyhole slot, a bar extending parallel with said member and having one end journalled in the opening, a squared extension on the other end of the bar which is received by the key hole slot and when positioned in one end of the slot is adapted to hold said bar against rotation and when positioned in the other end of the slot is adapted to permit the bar to be turned in either direction, teeth on said bar and one of said teeth being of a greater length than the other teeth to be the first to engage and bite into a piece of ice when placed on the bar.

3. An ice holder comprising an attaching member arranged transversely of and secured to a running board, upstanding ears at the ends of said member and one of said ears having an opening and the other ear having a keyhole slot, a bar extending parallel with said member and having one end journalled in the opening, a squared extension on the other end of the bar which is received by the keyhole slot and when positioned in one end of the slot is adapted to hold said bar against rotation and when positioned in the other end of said slot is adapted to permit the bar to be turned in either direction, parallel teeth on said bar and one of the end teeth being of greater length than the other teeth to be the first to engage and bite into a piece of ice when placed on the bar.

In testimony whereof I affix my signature.

ALEXANDER R. DEAN.